United States Patent
Nishimori (10) Patent No.: US 9,723,213 B2
(45) Date of Patent: Aug. 1, 2017

(54) IMAGE PROCESSING APPARATUS, CONTROL METHOD, AND RECORDING MEDIUM

(71) Applicant: CANON KABUSHIKI KAISHA, Tokyo (JP)

(72) Inventor: Koji Nishimori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 125 days.

(21) Appl. No.: 14/626,379

(22) Filed: Feb. 19, 2015

(65) Prior Publication Data

US 2015/0244941 A1 Aug. 27, 2015

(30) Foreign Application Priority Data

Feb. 21, 2014 (JP) ................................. 2014-032151

(51) Int. Cl.
H04N 5/232 (2006.01)

(52) U.S. Cl.
CPC ..... H04N 5/23293 (2013.01); H04N 5/23212 (2013.01); H04N 5/23216 (2013.01); H04N 5/23296 (2013.01); G06T 2207/10052 (2013.01)

(58) Field of Classification Search
CPC ...... H04N 5/23212; G06T 2207/10052; G06T 7/557

See application file for complete search history.

(56) References Cited

U.S. PATENT DOCUMENTS

| | | | |
|---|---|---|---|
| 2008/0193026 A1* | 8/2008 | Horie | H04N 5/23293 382/238 |
| 2010/0310232 A1* | 12/2010 | Iwase | G11B 27/34 386/241 |
| 2011/0129165 A1 | 6/2011 | Lim et al. | |
| 2013/0128069 A1 | 5/2013 | Georgiev et al. | |
| 2014/0049666 A1 | 2/2014 | Tsutsumi | |

FOREIGN PATENT DOCUMENTS

EP 2566150 A2 3/2013

OTHER PUBLICATIONS

Ren NG, et al., "Light Field Photography with a Hand-Held Plenoptic Camera", Stanford Tech Report CTSR Feb. 2005.
European Search Report issued on Jul. 20, 2015, that issued in the corresponding European Patent Application No. 15155808.7.

* cited by examiner

Primary Examiner — Ahmed A Berhan
(74) Attorney, Agent, or Firm — Cowan, Liebowitz & Latman, P.C.

(57) ABSTRACT

An image processing apparatus controls, when an instruction for performing enlarged display or reduced display of a reconstruction image displayed on a displaying medium is received, whether to cause enlarged display or reduced display of an image corresponding to the reconstruction image displayed on the displaying medium, or whether to cause to generate another reconstruction image in which a subject distance that is different from a subject image in the reconstruction image displayed on the displaying medium is focused, and to cause enlarged display or reduced display of the generated another reconstruction image.

18 Claims, 4 Drawing Sheets

IMAGE PROCESSING APPARATUS, CONTROL METHOD, AND RECORDING MEDIUM

BACKGROUND OF THE INVENTION

Field of the Invention

The present invention relates to an image processing apparatus, a control method, and a recording medium, and particularly to a technique for generating an image focused on an arbitrary subject distance from image data after capturing an image.

Description of the Related Art

Recently, a technique has been proposed for recording an intensity distribution and a traveling direction of light as output data when an image is captured with an imaging apparatus, such as a digital camera, in order to generate an image in which an arbitrary subject distance is focused from the output data after recording.

In Ren. Ng, et al., "Light Field Photography with a Hand-Held Plenoptic Camera", Stanford Tech Report CTSR 2005-02, a method is disclosed in which light incident from various directions is separated and recorded by forming light flux, that has passed through different divided pupil regions of an imaging lens, into an image on pixels (photoelectric conversion elements) of an imaging element via a microlens array. In the output data obtained in this manner (Light Field Data; hereinafter, LF data), adjacent pixels record light flux incident from different directions.

By extracting light flux of the same direction from pixels associated with each microlens, an image captured in that direction can be generated from the LF data. Also, pixels of an image in which a specific subject distance is focused can be generated (reconstructed) after capturing an image, by setting an arbitrary subject distance and adding the output of pixels that record light flux that has passed through one point on a focal plane corresponding to that subject distance.

With typical image viewing performed using a display apparatus, a user can enlarge an arbitrary region and check the captured state of the subject in the region. In an image captured by a regular imaging apparatus, the focused state of the subject, or in other words, the sharpness of the subject, is determined by the setting conditions and the like of the optical system at the time of capturing an image, and thus whether or not a user can recognize the details of the subject in a region of an image by enlarging the region is dependent on the focused state (of the subject).

Meanwhile, because a reconstruction image in which an arbitrary subject distance is focused can be generated from LF data obtained by capturing an image, for example, in the case where a specific region of the reconstruction image is enlarged, it is possible to enlarge and present the reconstruction image in which a subject in the region is focused.

However, the desired effect of an operation for checking the captured state of a subject by enlargement may differ depending on the user. For example, in the case where a user wants to output from LF data a reconstruction image of a state in which subjects other than the main subject are blurred, such as a portrait, enlarged display may be used as a way of checking that the subjects are in a desired blurred state. Also, for example, in the case where a user wants to output from LF data a reconstruction image in which a specific subject is not included in the depth of field, enlarged display may be used as a way of checking that the subject is not visually recognizable. Thus, generating an image in which a subject is focused, in a region where enlarged display is performed, does not necessarily coincide with the user's intention for performing the operation.

Also, although it is preferable, in the case where a user wants to check the details of a subject in a predetermined region, for example, that an image in which the subject is focused is presented at the time of enlarged display, the reconstruction image that a user desires to be presented when an operation for restoring the original magnification is performed may differ depending on the user. For example, in the case where a user only intended to check the details of a subject, it is preferable that a reconstruction image in the focused state before enlargement is presented after a reduction operation for restoring the original magnification is performed. On the other hand, for example, in the case where a user finds a subject that he or she wants to be focused by enlarged display and the focused state is changed so that the subject is focused, it is preferable that after the reduction operation is performed, a reconstruction image in a focused state similar to the state at the time of enlarged display is presented.

SUMMARY OF THE INVENTION

The present invention was made in view of such problems in the conventional technique. The present invention provides an image processing apparatus, a control method, and a recording medium that are capable of easily changing the focused state of a reconstruction image that a user wants to display after an operation related to enlarged display or reduced display.

The present invention in its first aspect provides an image processing apparatus comprising: an obtaining unit configured to obtain an image signal that is capable of generating a plurality of reconstruction images, wherein each subject included in the image having different subject distances is capable of being focused in each reconstruction image; a generating unit configured to generate a first reconstruction image from the image signal obtained by the obtaining unit; a display control unit configured to cause a displaying medium to display the first reconstruction image; a receiving unit configured to receive an instruction for performing enlarged display or reduced display of the first reconstruction image displayed on the displaying medium; and a control unit configured to control, when an instruction for performing enlarged display or reduced display of the reconstruction image displayed on the displaying medium is received, whether the control unit causes the display control unit to perform enlarged display or reduced display of an image corresponding to the first reconstruction image displayed on the displaying medium, or whether the control unit causes the generating unit to generate a second reconstruction image in which a subject distance that is different from a subject distance in the first reconstruction image displayed on the display control medium is focused and causes the displaying unit to perform enlarged display or reduced display of the generated second reconstruction image on the displaying medium.

The present invention in its second aspect provides an image processing apparatus comprising: an obtaining unit configured to obtain an image signal that is capable of generating a plurality of reconstruction images, wherein each subject included in the image having different subject distances is capable of being focused in each reconstruction image; a generating unit configured to generate reconstruction images from the image signal obtained by the obtaining unit; a determining unit configured to determine a subject distance to be focused in the reconstruction images to be generated by the generating unit; a receiving unit configured to receive an instruction related to enlarged display of a predetermined region of one of the reconstruction images, or an instruction related to reduced display of an enlarged one of the reconstruction images that is displayed; and a display control unit configured to cause a displaying medium to display one of the reconstruction images generated by the generating unit, wherein the determining unit determines a subject distance of one of the reconstruction image to be generated: as a subject distance in which a subject in a region where enlarged display is to be performed is focused in a case where an instruction related to enlarged display is received, and as a subject distance that is the same as the subject distance that is determined with regard to one of the reconstruction images displayed on the displaying medium before enlarged display, or one of the reconstruction images that is currently displayed on the displaying medium, in a case where an instruction related to reduced display is received, and the display control unit causes the displaying medium to display one of the reconstruction images generated by the generating unit based on the subject distance that is determined by the determining unit.

The present invention in its third aspect provides an image processing apparatus comprising: an obtaining unit configured to obtain an image signal that is capable of generating a plurality of reconstruction images, wherein each subject included in the image having different subject distances is capable of being focused in each reconstruction image; a generating unit configured to generate reconstruction images from the image signal obtained by the obtaining unit; a determining unit configured to determine a subject distance to be focused in the reconstruction images to be generated by the generating unit; a receiving unit configured to receive an instruction related to enlarged display of a predetermined region of one of the reconstruction images, or an instruction related to reduced display of an enlarged one of the reconstruction images that is displayed; and a display control unit configured to cause a displaying medium to display one of the reconstruction images generated by the generating unit, wherein the determining unit determines a subject distance of one of the reconstruction images to be generated: as a subject distance that is the same as the subject distance that is determined with regard to one of the reconstruction images that is currently displayed on the displaying medium in a case where an instruction related to enlarged display is received, and as a subject distance that is the same as the subject distance that is determined with regard to one of the reconstruction images displayed on the displaying medium before enlarged display, or one of the reconstruction images that is currently displayed on the displaying medium in a case where an instruction related to reduced display is received, and the display control unit causes the displaying medium to display one of the reconstruction images generated by the generating unit based on the subject distance that is determined by the determining unit.

The present invention in its fourth aspect provides a method for controlling an image processing apparatus having an obtaining unit configured to obtain an image signal that is capable of generating a plurality of reconstruction images, wherein each subject included in the image having different subject distance is capable of being focused in each reconstruction image, and a generating unit configured to generate a first reconstruction image from the image signal obtained by the obtaining unit, comprising: a displaying step of causing a displaying medium to display the first reconstruction image, a receiving step of receiving an instruction for performing enlarged display or reduced display of the first reconstruction image displayed on the displaying medium; and a control step of controlling, when an instruction for performing enlarged display or reduced display of the first reconstruction image displayed on the displaying medium is received, whether to cause enlarged display or reduced display of an image corresponding to the first reconstruction image displayed on the displaying medium, or whether to cause the generating unit to generate a second reconstruction image in which a subject distance different from a subject distance in the first reconstruction image displayed on the displaying medium is focused, and to cause enlarged display or reduced display of the generated second reconstruction image on the displaying medium.

Further features of the present invention will become apparent from the following description of exemplary embodiments (with reference to the attached drawings).

DESCRIPTION OF THE EMBODIMENTS

Hereinafter, an exemplary embodiment of the present invention will be described in detail with reference to the diagrams. It should be noted that in an embodiment described hereinafter an example is described in which the present invention is applied to a digital camera that is capable of generating an image in which an arbitrary subject distance is focused from LF data after capturing an image. However, the present invention can be applied to any apparatus that is capable of generating an image in which an arbitrary subject distance is focused from LF data. Each of the embodiments of the present invention described below can be implemented solely or as a combination of a plurality of the embodiments or features thereof where necessary or where the combination of elements or features from individual embodiments in a single embodiment is beneficial.

Also, the following terms are defined for the purposes of the present specification.

"Light Field (LF: Light Field) Data"

An image signal output from an imaging unit 106 included in a digital camera 100 of the present embodiment. Each pixel of the image signal shows a signal intensity corresponding to light flux resulting from different combinations of pupil regions and incidence directions of an imaging optical system 104 through which the light flux passed. LF data is also referred to as light field information.

"Reconstruction Image"

An image that is generated from LF data and in which an arbitrary subject distance is focused. Specifically, pixels of the LF data corresponding to light flux that passes through the respective pixels are combined in accordance with the pixel arrangement on a focal plane (reconstruction plane) to be generated that corresponds to a subject distance, and thereby pixel values of the pixels are obtained. The reconstruction plane may include a focal plane, corresponding to a physical focal plane when the LF data is captured, and a plurality of virtual focal planes. The corresponding pixels are specified based on information on the incidence direction of the light flux that is incident on each pixel if an imaging element were to exist in the reconstruction plane.

Configuration of Digital Camera 100

Figure 1:
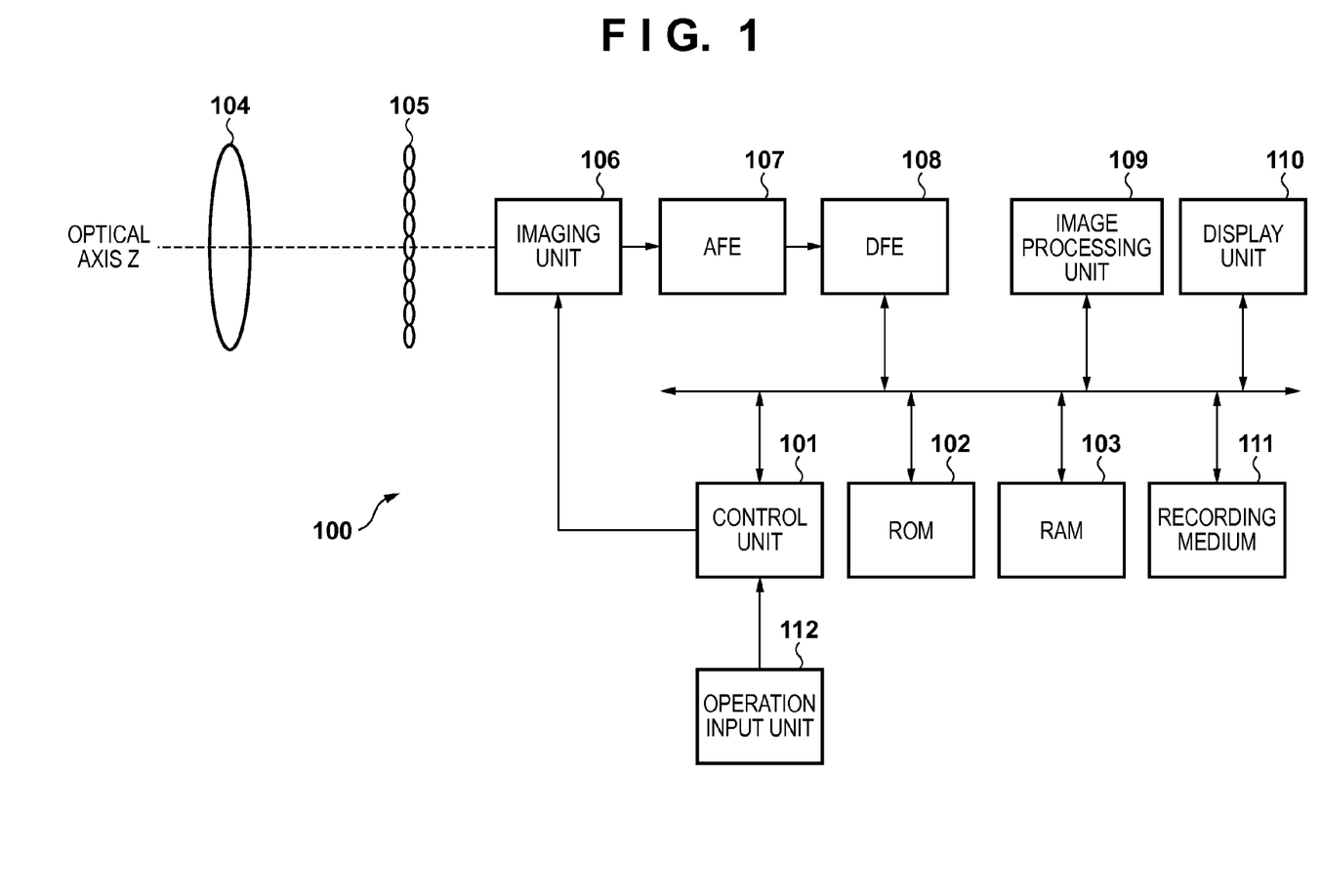
FIG. 1 is a block diagram showing a functional configuration of a digital camera 100 according to an embodiment of the present invention.

FIG. 1 is a block diagram showing the functional configuration of the digital camera 100 according to an embodiment of the present invention.

A control unit 101 is a CPU, for example, and controls operations of blocks included in the digital camera 100. Specifically, the control unit 101 controls operations of the blocks by reading out and extracting from a RAM 103 operation programs for image capture processing (described later), or refocus moving image generation processing that are stored in a ROM 102, and executing the read operation programs.

The ROM 102 is a rewritable non-volatile memory, for example, and stores parameters and so on that are necessary for the operations of the blocks, in addition to storing the operation programs of the blocks included in the digital camera 100.

The RAM 103 is a volatile memory. The RAM 103 is not only used as a region where the operation programs of the blocks included in the digital camera 100 are extracted, but also as a storage region where intermediate data and so on that are output in the operations in the blocks are stored.

The imaging unit 106 is an imaging element such as a CCD or a CMOS sensor, for example. The imaging unit 106 receives a timing signal output from a timing generator (TG) (not shown) as a result of receiving an instruction from the control unit 101, and photoelectrically converts an optical image that is formed by an imaging optical system 104 on the plane of a photoelectric conversion element of the imaging element and outputs an analog image signal. It should be noted that the imaging optical system 104 includes, for example, a field lens, a focus lens, an aperture and so on. Also, the digital camera 100 of the present embodiment has a microlens array 105 between the imaging optical system 104 and the imaging element on an optical axis, separately from the microlenses provided in photoelectric conversion elements of the imaging element.

Relationship Between Microlens and Photoelectric Conversion Element

Here, the microlens array 105 provided between the imaging optical system 104 and the imaging element on the optical axis in the digital camera 100 of the present embodiment is described using diagrams.

Figure 2:
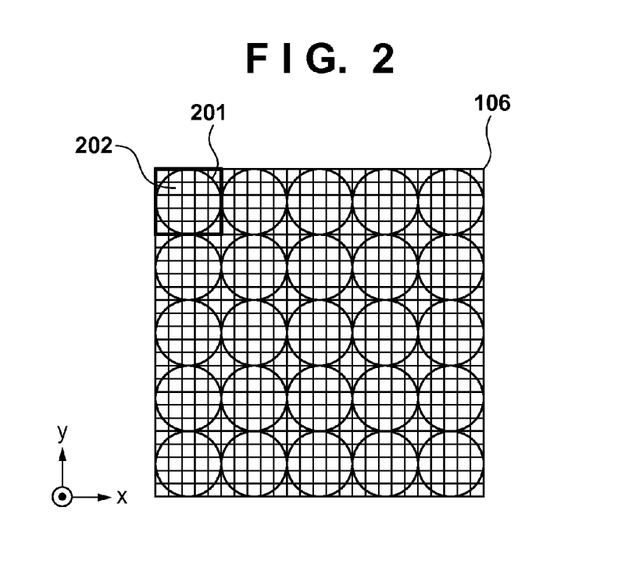
FIG. 2 is a diagram for explaining a relationship between a microlens array 105 and an imaging unit 106 according to the embodiment of the present invention.

As shown in FIG. 2, the microlens array 105 of the present embodiment is configured with a plurality of microlenses 201. In FIG. 2, the optical axis of the imaging optical system 104 is denoted as the z axis, the horizontal direction of the digital camera 100 in a horizontal position is denoted as the x axis, and the vertical direction thereof is denoted as the y axis. It should be noted that although description is given in which the microlens array 105 is configured by microlenses 201 arranged in five rows and five columns for simplification in the example of FIG. 2, the configuration of the microlens array 105 is not limited to this.

Also, the photoelectric conversion devices 202 of the imaging element that constitutes the imaging unit 106 are shown in a grid in FIG. 2. A predetermined number of the photoelectric conversion elements 202 are associated with each microlens 201, and photoelectric conversion elements 202 having 25 (5×5) pixels are associated with one microlens 201 in the example of FIG. 2. Of course the number and arrangement of photoelectric conversion elements is not limited to this. The light flux that has passed through one microlens 201 is separated depending on the incidence direction, and an image is formed in the corresponding photoelectric conversion elements 202.

Figure 3:
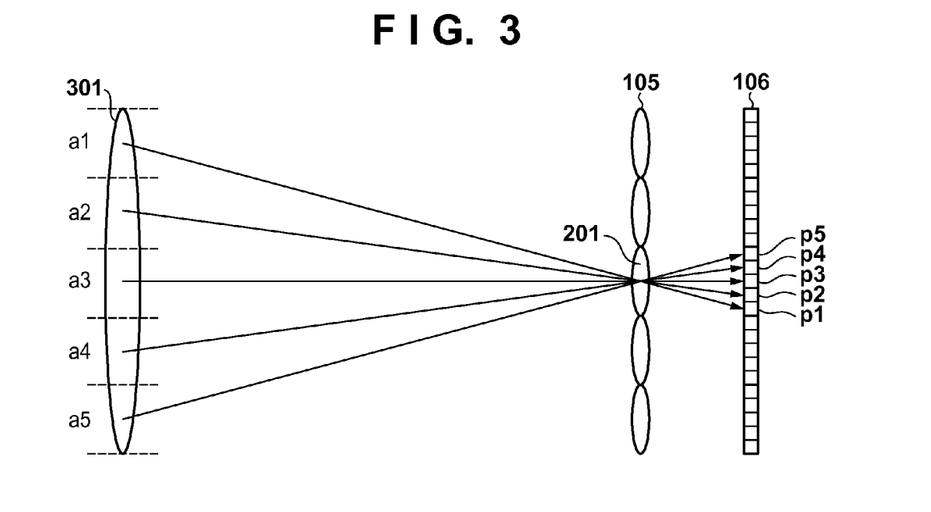
FIG. 3 is a diagram for explaining a relationship between light flux that has passed through each region of an exit pupil 301 according to the embodiment of the present invention and a photoelectric conversion element that photoelectrically converts the light flux.

FIG. 3 is a diagram showing the light flux incident on the photoelectric conversion elements 202-$p1$ to $p5$ corresponding to one microlens 201. In FIG. 3, a direction out of the plane of the paper corresponds to the vertical Y-axis direction of FIG. 2. In FIG. 3, a light path of the light flux incident on the photoelectric conversion element 202 is illustrated as viewed from the lateral direction (y-axis) in a state in which the digital camera 100 is in the so-called horizontal position. As shown in FIG. 3, the light flux that has passed through five regions a1 to a5 into which an exit pupil 301 of the imaging optical system 104 is vertically divided is incident on the photoelectric conversion elements 202-$p1$ to $p5$ arranged in the horizontal direction via one microlens 201. It should be noted that the number given to each region shows the correspondence relationship between the light flux that has passed therethrough and the light flux that is incident on the photoelectric conversion elements 202.

Figure 4A:
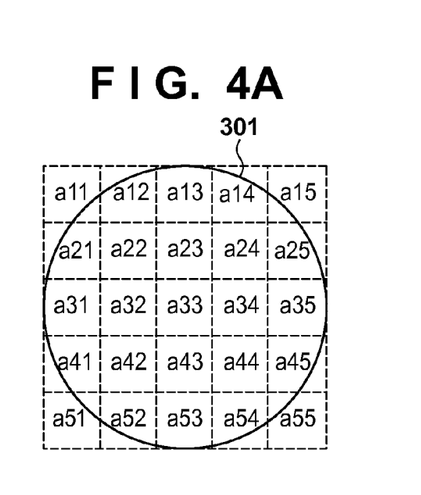
FIGS. 4A and 4B are diagrams showing the association between each region of the exit pupil 301 according to the embodiment of the present invention and the photoelectric conversion element associated with each microlens.

It should be noted that although the light path of the light flux incident on each photoelectric conversion element 202 as viewed from the lateral direction is shown in the example of FIG. 3, separation of the light flux is not limited to the vertical direction and is similarly performed in the horizontal direction. In other words, in the case where, when viewed from the imaging element side, the exit pupil 301 of the imaging optical system 104 is classified into regions such as in FIG. 4A, the light flux that has passed through each region is incident on the photoelectric conversion element to which the same identification number is given among the photoelectric conversion elements 202 shown in FIG. 4B. It should be noted that, herein, the f-number of the imaging optical system 104 substantially matches that of microlenses of the microlens array 105.

Returning to FIG. 1, an AFE (Analog Front End) 107 and a DFE (Digital Front End) 108 perform correction processing and the like on image signals generated by the imaging unit 106. Specifically, the AFE 107 adjusts a reference level (clamp processing) and performs A/D conversion processing on analog image signals output from the imaging unit 106, and outputs LF data to the DFE 108. The DFE 108 corrects minute shifts in the reference level and the like of the input LF data.

An image processing unit 109 applies various image processes such as color conversion processing to the LF data to which correction processing has been applied by the DFE 108. Also, the image processing unit 109 performs processing in which an image (reconstruction image) in which an arbitrary subject distance is focused is generated from the LF data in the present embodiment. The method of "Light Field Photography" shown by Ren described above may be used to generate the reconstruction image. The combination of the imaging optical system 104, the microlens array 105, the imaging unit 106, the AFE 107, DFE 108 and the image processing unit 109 may be thought of as an obtaining means for obtaining an image signal that is capable of generating a plurality of reconstructions images.

Method for Generating a Reconstruction Image

Here, the outline of a method for generating a reconstruction image in which a specific subject distance is focused is described using diagrams.

First, it is possible to obtain a subject distance at which a specific subject included in the image capture range is focused with the method described below. First, the image processing unit 109 generates images corresponding to two light fluxes that have passed through different divided pupil regions from LF data, and detects a difference (a defocus amount) in the image of the specific subject between the images. The control unit 101 is capable of calculating the subject distance at which a specific subject is focused based on the defocus amount detected in this manner. In another embodiment, since a defocus amount on a certain physical focal plane corresponds to a subject distance one-to-one, determinations or processes, which refer to subject distances, described below may be realized by referring to corresponding defocus amounts instead of subject distances.

Figure 4B:
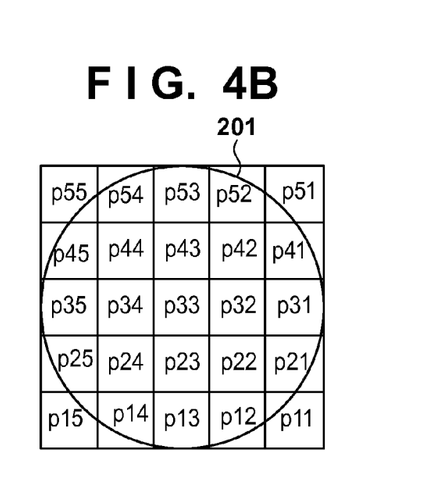

In the example of FIG. 4B, with regard to each microlens, an A image can be generated that corresponds to the divided pupil regions on the left half of the exit pupil 301, and that is generated by adding pixel values of pixels in a first column and a second column among the corresponding pixels. Also, a B image can be generated that corresponds to the divided pupil regions on the right half of the exit pupil 301, and that is generated by adding pixel values of pixels in a fourth column and a fifth column among the corresponding pixels. In other words, this is expressed as the following equations.

$$\sum_{a=1}^{5}\sum_{b=1}^{2}(p_{ab}) \text{ left half region}$$

$$\sum_{a=1}^{5}\sum_{b=4}^{5}(p_{ab}) \text{ right half region}$$

The two types of reconstruction images obtained in this manner are images in which the centroid position of the corresponding divided pupil regions serves as the optical axis.

In other words, two types of reconstruction images have image differences caused by differences in the optical axes, and thus the amount of difference in the images (pupil division phase difference) with regard to each subject can be detected by performing a correlation operation on the two images. A subject distance in which each subject included in an image capture range in the LF data is focused can be analyzed from the image difference amount obtained in this manner, and, for example, a reconstruction image in which a specific subject is focused can be generated as an additional image.

Next, the generation of a reconstruction image in which a specific subject distance is focused is described. In the digital camera 100 of the present embodiment, as described above, a plurality of pixels assigned to one microlens each receives light flux that has passed through different divided pupil regions of the exit pupil of an imaging lens. This similarly applies to all microlenses of the microlens array 105. Also, because the light flux that has passed through the imaging lens is incident on each microlens from different directions, all of the pixels of the imaging element each receive the light flux from different directions.

Therefore, hereinafter, the light path of the light flux incident on each pixel of the LF data obtained by capturing an image is described where each light flux is defined as coordinates (u, v) of a pupil region in the exit pupil through which the light flux has passed, and as position coordinates (x', y') of the corresponding microlens. When a reconstruction image is generated, with regard to a pixel (x, y) on a reconstruction plane that corresponds to an arbitrary subject distance and in which the reconstruction image is generated, the pixel values can be obtained by integrating the light flux having the light path passing through the point.

Figure 5:
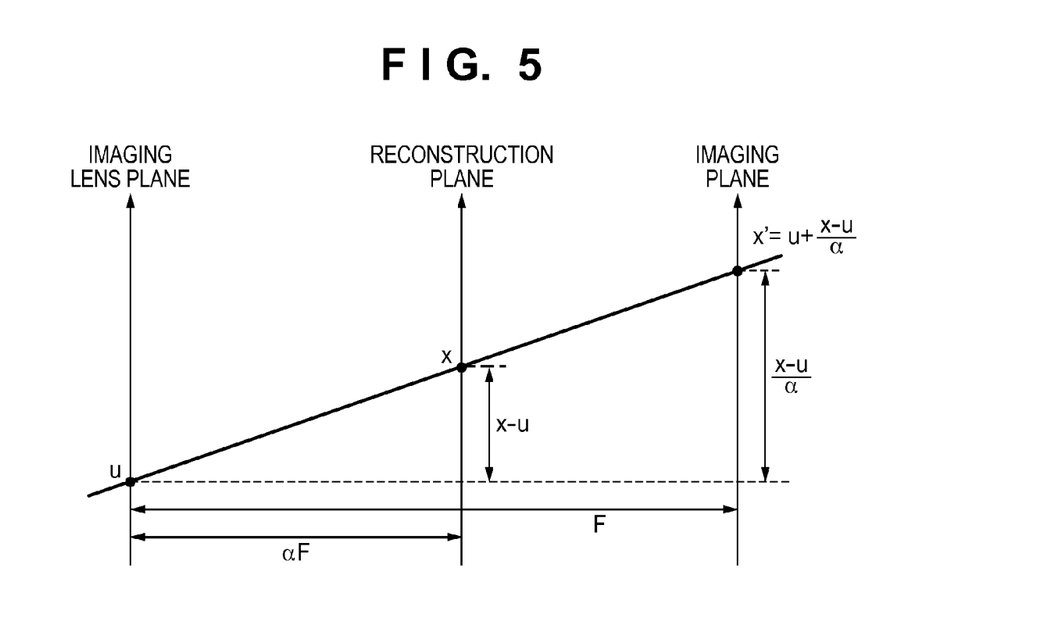
FIG. 5 is a diagram for explaining a relationship between a specific position of the light flux on a reconstruction plane according to the embodiment of the present invention and a passing position thereof on an imaging plane.

In FIG. 5, the light path of the light flux in a horizontal plane (xz plane) viewed from a vertical direction of the digital camera 100 in a horizontal position is shown. Hereinafter, although the light path of the light flux passing through each pixel of the reconstruction plane on an xz plane is described, this is similar to a yz plane.

When a pupil region is denoted by coordinates (u, v), and a pixel on a reconstruction plane is denoted by coordinates (x, y), the position coordinates (x', y') of a microlens on the microlens array 105 on which the light flux that passes through the pupil division region and a pixel on the reconstruction plane is incident are expressed as follows.

$$(x', y') = \left(u + \frac{x-u}{\alpha}, v + \frac{y-v}{\alpha}\right)$$

It should be noted that F is a distance from an imaging lens to the microlens array, and αF is a distance from the imaging lens to a reconstruction plane (α is a refocus coefficient: a variable coefficient for determining a distance to the reconstruction plane).

Also, when the output of a photoelectric conversion element that receives the light flux is denoted by L (x', y', u, v), a pixel output E (x, y) at coordinates (x, y) of an image formed on the reconstruction plane is obtained by integrating L (x', y', u, v) with regard to a pupil region of the imaging lens and is expressed as follows.

$$E(x, y) = \frac{1}{\alpha^2 F^2} \int\int L\left(u + \frac{x-u}{\alpha}, v + \frac{y-v}{\alpha}, u, v\right) du dv$$

It should be noted that the equation can be calculated by simple addition where (u, v) is the representative coordinates of the pupil region.

Returning again to FIG. 1, a displaying unit 110 is, for example, a displaying medium included in the digital camera 100 such as a small LCD. The displaying unit 110 displays an image that is generated by the image processing unit 109 and in which an arbitrary subject distance is focused. The control unit 101 controls the display on displaying unit 110, and may be considered as a display control means 101. As described above, in the LF data obtained by performing A/D conversion on analog image signals output from the imaging unit 106 of the present embodiment, images are not continuous in adjacent pixels. Accordingly, the displaying unit 110 displays image data generated by the image processing unit 109 instead of LF data. It should be noted that although the present embodiment is described using the digital camera 100 as an example of image processing apparatuses, and thus description is given in which the displaying unit 110 is integrated in the digital camera 100, the present invention is not limited to this embodiment. In other words, it can be easily understood that display of a reconstruction image generated by an image processing apparatus may be controlled so that the reconstruction image is displayed on an external display apparatus connected to the image processing apparatus, and the display apparatus is not necessarily integrated in an image processing apparatus.

A recording medium 111 is, for example, an internal memory included in the digital camera 100, or a recording apparatus such as a memory card or a HDD that is detachably connected to the digital camera 100. The recording medium 111 records LF data, and an image that is generated from such LF data and in which an arbitrary subject distance is focused.

An operation input unit 112 is a user interface included in the digital camera 100, such as a power button or a shutter button, for example. Upon detecting that a user has operated the user interface, the operation input unit 112 outputs a control signal or a command that corresponds to the operation to the control unit 101.

Also, the displaying unit 110 of the present embodiment is a touch panel display that detects a touch input, and the operation input unit 112 receives a signal output from a sensor that performed the touch detection, analyzes the operation resulting from the touch input, and outputs a corresponding command to the control unit 101. In the case where a sequential increase (pinch-out) in an interval of two touch inputs performed in a display region of the displaying unit 110 is detected, the operation input unit 112 of the present embodiment determines that an operation related to enlarged display was performed. Also, in the case of detecting a sequential decrease (pinch-in) in an interval of two touch inputs performed in a display region, the operation input unit 112 determines that an operation related to reduced display was performed.

Display Enlargement/Reduction Processing

Figure 6:
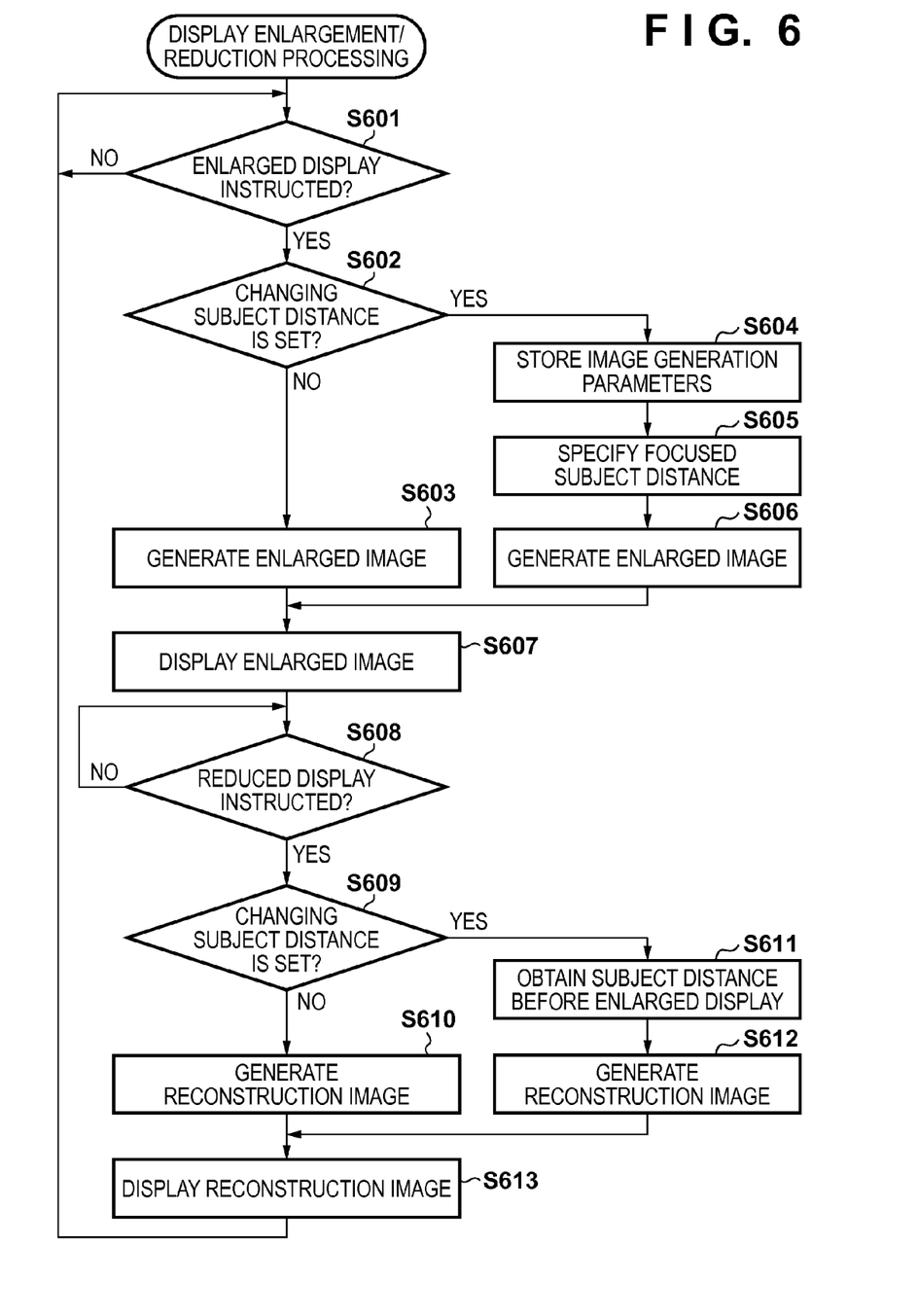
FIG. 6 is a flowchart illustrating display enlargement/reduction processing that is executed by a digital camera 100 according to the embodiment of the present invention.

With regard to display enlargement/reduction processing of the digital camera 100 in the present embodiment having such a configuration, specific processing is described using a flowchart in FIG. 6. Processing that corresponds to the flowchart can be realized by the control unit 101, for example, reading out a corresponding processing program stored in the ROM 102, extracting the read processing program in the RAM 103, and executing the extracted processing program. It should be noted that description is given in which the present display enlargement/reduction processing is started when, for example, the digital camera 100 is started in a viewing mode, and a reconstruction image in which one subject distance is focused is generated from LF data recorded in the recording medium 111 and displayed. Also, although description is given in which reduced display of a reconstruction image is performed after enlarged display is performed for simplification, the present invention is not limited to this embodiment.

In step S601, the control unit 101 determines whether an instruction for enlarged display of a reconstruction image has been given. Specifically, the control unit 101 performs the determination of this step by determining whether or not a control signal that indicates that enlarged display has been performed is received from the operation input unit 112. In the case of determining that an instruction for enlarged display of a reconstruction image has been given, the control unit 101 stores in the RAM 103, as enlarged display parameters, information that is included in the control signal on, for example, coordinates that will be at the center of the image after enlarged display is performed, and on the display magnification after enlarged display is performed, and moves the processing to step S602. Also, in the case of determining that an instruction for performing enlarged display of a reconstruction image is not given, the control unit 101 repeats the processing in this step.

In step S602, the control unit 101 determines whether or not the digital camera 100 is currently set to change the subject distance to be focused when enlarged display of the reconstruction image is performed. The user controls the digital camera 100 of the present embodiment so as to change the subject distance to be focused at the time of enlarged display or reduced display while another touch input, other than the touch input related to enlarged display, is given in a predetermined region within a display region of the displaying unit 110. This may be performed by the control unit 101 setting true logic-based information (focus change flag) stored in the RAM 103, and referring to the information in this step while receiving control signals corresponding to the touch input from the operation input unit 112, for example. It should be noted that although description is given in which whether or not a subject distance to be focused is changed at the time of enlarged display is switched by the presence or absence of a predetermined touch input in the present embodiment, the switching is not limited to a touch input and may be performed in response to other operation inputs. Although the switching may be carried out in response to, for example, an operation input related to a setting change in the viewing mode being performed, the switching is preferably performed by a simple operation that is easily input along with the operation input for enlarged display or reduced display in order to facilitate the switching by the user. Naturally, the switching may be carried out through input to an operation member such as a predetermined switch or button. The control unit 101 moves the processing to step S604 in the case of determining that changing the subject distance to be focused at the time of enlarged display is currently set, and moves the processing to step S603 in the case of determining that this is not the case.

In step S603, under the control of the control unit 101, the image processing unit 109 generates a reconstruction image with regard to a subject distance used in the generation of the reconstruction image that is currently displayed on the displaying unit 110. The image processing unit 109 then extracts an image of a region to be enlarged that is indicated by enlarged display parameters, and generates an enlarged image that is enlarged to a designated display magnification. It should be noted that, needless to say, if the reconstruction image that is currently displayed exists, for example, in an image memory (not shown) in a re-usable format, an enlarged image may be generated using this image.

On the other hand, in the case of determining that changing the subject distance to be focused at the time of enlarged display is currently set in step S602, the control unit 101 performs processing as follows in step S604. The control unit 101 stores various image generation parameters in the RAM 103, including information on the subject distance used in the generation of the reconstruction image that is currently displayed on the displaying unit 110.

In step S605, the control unit 101 refers to the enlarged display parameters, and specifies a subject distance in which a subject included in a region to be enlarged is focused. In the digital camera 100 of the present embodiment, in the case of performing enlarged display when a focus change flag is on, a reconstruction image in which a subject included in a region to be displayed after enlarged display (a region to be enlarged) is focused is displayed. It should be noted that a subject distance in which a subject included in a region to be enlarged is focused may be a subject distance in which a subject that is present in the center of the region is focused, for example. Alternatively, in the case of classifying subjects corresponding to respective pixels in the region into distances to the digital camera 100 at the time of capturing an image, the subject distance may be determined based on the distance range into which the majority of subjects (pixels) are classified. In other words, any criterion may be used to specify the subject distance, as long as the subject distance specified in this step is a subject distance in which one of the subjects included in the region is focused, in the case of generating a reconstruction image based on the subject distance. It should be noted that subject distances calculated by a method based on the amount of differences in images as described above may be used in specifying the subject distances.

In step S606, under the control of the control unit 101, the image processing unit 109 newly generates a reconstruction image in which the subject in the subject distance is focused from LF data, based on a subject distance in which a subject in the subject distance specified in step S605 is focused. The image processing unit 109 then extracts an image in a region to be enlarged from the reconstruction image, and generates an enlarged image that is enlarged to a designated display magnification.

In step S607, the control unit 101 sends to and causes the displaying unit 110 to display the enlarged image generated by the image processing unit 109.

Hereinafter, processing after the reconstruction image that is enlarged and displayed on the displaying unit 110 through such processing is displayed is described.

In step S608, the control unit 101 determines whether or not an instruction for performing reduced display of the enlarged reconstruction image, that is displayed, is given. It should be noted that although in the present embodiment description is given in which, in the case where an instruction for performing reduced display of the enlarged image after enlarged display is given, display magnification is restored to the original display magnification before the enlarged display, the present invention is not limited to this embodiment. For example, the display magnification may be reduced to another display magnification different from the original display magnification due to reduction. The control unit 101 moves the processing to step S609 in the case of determining that an instruction for performing reduced display of the enlarged reconstruction image that is displayed is given, and repeats the processing of this step in the case of determining that the instruction is not given.

In step S609, the control unit 101 determines whether or not the digital camera 100 is currently set to change the subject distance to be focused at the time of reducing and displaying the enlarged reconstruction image that is displayed. In other words, the control unit 101 refers to a focus change flag stored in the RAM 103 and determines whether or not the flag is on. It should be noted that although in the present embodiment, description is given in which the determination is performed depending on whether the same operation input is performed for whether or not a subject distance is changed at the time of enlarged display, and for whether or not a subject distance is changed at the time of reduced display, the determination may be performed based on different operation inputs. The control unit 101 moves the processing to step S611 in the case of determining that changing the subject distance to be focused at the time of reduced display is currently set, and moves the processing to step S610 in the case of determining that this is not the case.

In step S610, under the control of control unit 101, the image processing unit 109 generates a reconstruction image with regard to a subject distance used in the generation of the reconstruction image from which the enlarged image that is currently displayed on the displaying unit 110 is extracted. In other words, the reconstruction image generated in this step is an image in a focused state similar to the enlarged reconstruction image that is displayed. Accordingly, for example, in the case where a subject distance to be focused at the time of enlarged display is changed, a reconstruction image in a state in which the change is maintained at the time of reduction is displayed on the displaying unit 110. It should be noted that, needless to say, in the case where the reconstruction image from which the enlarged image that is currently displayed is extracted exists, for example, in an image memory (not shown) in a re-usable format, this image may be used.

Meanwhile, in the case of determining that changing a subject distance to be focused at the time of reduced display is set in step S609, the control unit 101 obtains information on the subject distance used in the generation of the reconstruction image displayed on the displaying unit 110 before performing enlarged display, in step S611. Specifically, the control unit 101 reads out image generation parameters with regard to the reconstruction image displayed before enlarged display from the RAM 103 and obtains the information. It should be noted that because description is given in which image generation parameters are stored in step S604 in the present display enlargement/reduction processing, in other words, image generation parameters are stored only in the case where the subject distance is changed at the time of enlarged display, the image generation parameters do not exist in the case where the subject distance is not changed at the time of enlarged display. This is because in the case where the subject distance is not changed at the time of enlarged display, the image processing unit 109 also generates a reconstruction image at the time of generation of the enlarged image using the same parameters as those used before enlarged display and thus the image processing unit 109 holds the parameters. However, the present invention is not limited to this, and it may be configured that image generation parameters are stored in the RAM 103 when an instruction for performing enlarged display is given, regardless of whether the subject distance is changed at the time of enlarged display. Thereby, for example, even if a subject distance to be focused is changed after enlarged display, it is possible to refer to image generation parameters prior to enlarged display. Also, when the subject distance to be focused is changed after enlarged display instead of before enlarged display, image generation parameters may be stored.

In step S612, based on the subject distance used in the generation of the reconstruction image displayed on the displaying unit 110 before performing enlarged display, the image processing unit 109 newly generates a reconstruction image in which the subject distance is focused from LF data under the control of the control unit 101. In other words, a reconstruction image generated in this step is an image in a focused state in which the reconstruction image does not necessarily correspond to the enlarged reconstruction image that is displayed. Thus, for example, in the case where a subject distance to be focused is changed at the time of enlarged display, the change is discarded at the time of reduction, and a reconstruction image in a focused state that is the same as the reconstruction image displayed before enlarged display is displayed on the displaying unit 110.

In step S613, the control unit 101 sends the reconstruction image generated by the image processing unit 109 to the displaying unit 110 and causes the displaying unit 110 to display the image, before moving the processing to step S601.

Thereby, with the digital camera 100 of the present embodiment, a user is able to easily view a reconstruction image in a desired focused state in the case of performing an operation related to enlarged display or reduced display in which display magnification is restored to the original display magnification after enlarged display.

It should be noted that although description was given in which after a reconstruction image is enlarged and displayed, it is possible to give only an instruction for performing reduced display in the present embodiment, the present invention is not limited to this. In other words, a user may also give an instruction for enlarged display after enlarged display, and also in this case, enlarged display parameters and image generation parameters may be similarly stored and processed. At this time, it is possible to configure the parameters such that they are held step-by-step in accordance with the number of operations. For example, in the case of transition from an enlarged image related to enlarged display in a first stage to an enlarged image in which a focused state is changed in enlarged display in a second stage, parameters are separately stored, and thereby when an instruction for performing reduced display of the enlarged image in the second stage is given, the image can be returned to the enlarged image in the first stage. Moreover, when an instruction for performing reduced display of the enlarged image in the first stage is given, the image can be returned to the reconstruction image before enlarged display in the first stage was performed. It should be noted that it is not necessary that display magnification is restored step-by-step, and in the case where a predetermined operation is performed, for example, an enlarged image in the second stage may be returned to the reconstruction image before enlarged display in the first stage was performed.

Also, for example, in the case where the image processing unit 109 has a function of detecting the image of a person from an image, a configuration may be adopted in which changing the subject distance to be focused is set, only in the case where the image processing unit 109 determines that enlarged display is an operation for determining a focused state of the person, and the person is not focused in the displayed reconstruction image. Accordingly, it is possible to check the details of the focused state of the person due to enlarged display. Also, in the case where the focused state is slightly out of focus in normal display, or in the case where nobody is focused in normal display, it is possible to focus on a person in a region to be displayed after enlarged display, and to forcibly keep the focused state after reduced display. In other words, in the case where a person is detected once in a reconstruction image, the focused state of the person may be forcibly kept even if enlarged display/reduced display is performed thereafter. It should be noted that such control is not limited to people, and may be performed using a subject detection function of detecting a preset specific subject.

As described above, an image processing apparatus of the present embodiment is capable of easily changing a focused state of a reconstruction image to be displayed after an operation related to enlarged display or reduced display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s). Alternatively the computer of the system or apparatus may include one or more circuits (e.g., application specific integrated circuit (ASIC)) for performing the functions of one or more of the above-described embodiment(s). Furthermore, the computer of the system or apparatus may perform a method by, for example, reading out and executing the computer executable instructions from the storage medium to perform the functions of one or more of the above-described embodiment(s), and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-032151, filed Feb. 21, 2014, which is hereby incorporated by reference herein in its entirety.

What is claimed is:

1. An image processing apparatus comprising:
   one or more processors; and
   a memory storing instructions which, when the instructions are executed by the one or more processors, cause the image processing apparatus to function as:
   an obtaining unit configured to obtain an image signal that is capable of generating a plurality of reconstruction images which have mutually different focus states;
   a generating unit configured to generate a reconstruction image from the image signal obtained by the obtaining unit;
   a display control unit configured to cause a display to display a reconstruction image generated by the generation unit;
   a receiving unit configured to receive an instruction for performing enlarged display or reduced display; and
   a control unit,
   wherein, upon receiving an instruction for performing enlarged display or reduced display while a reconstruction image is displayed on the display, the control unit selectively causes the display control unit to perform enlarged display or reduced display of the displayed reconstruction image, or to perform enlarged display or reduced display of an other reconstruction image which is generated by the generating unit and has a different focus state from the displayed reconstruction image.

2. The image processing apparatus according to claim 1, wherein, upon receiving an instruction for performing enlarged display while a reconstruction image is displayed on the display, the control unit causes the generating unit to generate the other reconstruction image in which a subject in a region to be enlarged of the displayed reconstruction image is focused.

3. The image processing apparatus according to claim 1, wherein, upon receiving an instruction for performing reduced display of an image in a state of enlarged display, the control unit causes the display control unit to display a reconstruction image which has the same focus state as a reconstruction image displayed before the enlarged display.

4. The image processing apparatus according to claim 1, wherein the receiving unit further receives an instruction related to a predetermined operation input, and
upon receiving an instruction for performing enlarged display or reduced display of the displayed reconstruction image while an instruction related to the predetermined operation input is received, the control unit causes the display control unit to perform enlarged display or reduced display the displayed reconstruction image.

5. The image processing apparatus according to claim 1, wherein the receiving unit further receives an instruction related to a predetermined operation input, and
upon receiving an instruction for performing enlarged display or reduced display of the displayed reconstruction image while an instruction related to the predetermined operation input is received, the control unit causes the displaying unit to perform a enlarged display or reduced display of the other second reconstruction image.

6. The image processing apparatus according to claim 1, wherein the receiving unit receives an instruction for performing enlarged display or reduced display via a touch input.

7. The image processing apparatus according to claim 6, wherein the receiving unit receives an instruction for performing enlarged display and reduced display through pinch-out and pinch-in operations.

8. The image processing apparatus according to claim 1, wherein the reduced display is a command for restoring a display magnification changed by the enlarged display to display magnification prior to the change.

9. The image processing apparatus according to claim 1, wherein the instructions stored in the memory further cause the image processing apparatus to function as:
a detecting unit configured to detect a specific subject from a reconstruction image,
wherein in a case where e the specific subject is detected by the detecting unit in the displayed reconstruction image, upon receiving an instruction for performing enlarged display or reduced display, the control unit causes the generating unit to generate the other reconstruction image in which a subject distance to be focused is changed.

10. The image processing apparatus according to claim 1, wherein upon receiving an instruction for performing enlarged display or reduced display of the displayed reconstruction image,
the control unit determines:
in a case where a subject distance to be focused is set to be changed at the time of enlarge display, as a subject distance to be focused, a subject distance corresponding to a subject in a region where enlarged display is to be performed;
in a case where a subject distance to be focused is set not to be changed at the time of enlarged display, as a subject distance to be focused, a subject distance that is the same as the subject distance that is determined with regard to the displayed reconstruction image that is currently displayed on the display;
in a case where subject distance to be focused at the time of reduced display set to be changed, as a subject distance to be focused, a subject distance that is the same as the subject distance that is determined with regard to the displayed reconstruction image displayed before enlarged display; and
in a case where a subject distance to be focused at the time of reduced display is set not to be changed, as a subject distance to be focused, a subject distance that is the same as the subject distance that is determined with regard to the displayed reconstruction image or the other reconstruction image that is currently displayed on the display.

11. The image processing apparatus according claim 1, wherein the image signal that is capable of generating the plurality of reconstruction images is captured by an imaging unit including a plurality of microlens, each of which corresponds to a plurality of photoelectric conversion elements.

12. The image processing apparatus according o claim 1, further comprising an imaging unit including a plurality of microlens, each of corresponds to a plurality of photoelectric conversion elements configured to capture the image signal that is capable of generating the plurality of reconstruction images.

13. The image processing apparatus according to claim 1, wherein the image signal that is capable of generating the plurality of reconstruction images is light-field data.

14. The image processing apparatus according to claim 1, wherein the generating unit generate a reconstruction image by combining pixels of the image signal in accordance with pixel arrangement a focal plane.

15. An image processing apparatus comprising:
one or more processors; and
a memory storing instructions which, when the instructions are executed by the one or more processors, cause the image processing apparatus to function as:
an obtaining unit configured to obtain an image signal that is capable of generating a plurality of reconstruction images which have mutually different focus states;
a generating unit configured to generate a reconstruction image from the image signal obtained by the obtaining unit;
a display control unit configured to cause a display to display a reconstruction image generated by the generating unit;
a receiving unit configured to receive an instruction for performing enlarged display of an image corresponding to a part of a reconstruction image while a reconstruction image is displayed on the display, or an instruction for performing reduced display of an enlarged image while an image corresponding to a part of a reconstruction image is displayed on the display; and
a control unit,
wherein, upon receiving an instruction for performing enlarged display while a reconstruction image is displayed on the display, the control unit causes the display control unit to perform enlarged display of an image corresponding to a reconstruction image which is generated by the generating unit and has a focus state which a subject in the part of the displayed reconstruction image is focused, and
wherein, upon receiving an instruction for performing reduced display of the enlarged image while an image corresponding to a part of a reconstruction image is displayed on the display, the control unit causes the display control unit to perform reduced display of the enlarged image by displaying a reconstruction image which is generated by the generating unit and displayed before the enlarged display.

16. An image processing apparatus comprising:
one or more processors; and
a memory storing instructions which, when the instructions are executed by the one or more processors, cause the image processing apparatus to function as:
an obtaining unit configured to obtain an image signal that is capable of generating a plurality of reconstruction images which have mutually different focus states;
a generating unit configured to generate a reconstruction image from the image signal obtained by the obtaining unit;
a display control unit configured to cause a display to display a reconstruction image generated by the generating unit;
a receiving unit configured to receive an instruction for performing enlarged display of an image corresponding to a part of a reconstruction image while a reconstruction image is displayed on the display, or an instruction for performing reduced display of an enlarged image while an image corresponding to a part of a reconstruction image is displayed on the display; and
a control unit,
wherein, upon receiving an instruction for performing enlarged display while a reconstruction image is displayed on the display, the control unit causes the display control unit to perform enlarged display of the displayed reconstruction image, and
wherein, upon receiving an instruction for performing reduced display of the enlarged image while an image corresponding to a part of a reconstruction image is displayed on the display, the control unit causes the display control unit to perform reduced display of the enlarged image by displaying a reconstruction image which is generated by the generating unit and displayed before the enlarged display.

17. A method for controlling an image processing apparatus, comprising:
obtaining an image signal that is capable of generating a plurality of reconstruction images which have mutually different focus states;
generating a reconstruction image from the obtained image signal;
causing a display to display a generated reconstruction image, and
receiving an instruction for performing enlarged display or reduced display;
wherein, upon receiving an instruction for performing enlarged display or reduced display while a reconstruction image is displayed on the display, enlarged display or reduced display of the displayed reconstruction image, or enlarged display or reduced display of an other reconstruction image having a different focus state from the displayed reconstructed image is selectively performed.

18. A non-transitory computer-readable recording medium recording a program for causing a computer to perform:
obtaining an image signal that is capable of generating a plurality of reconstruction images which have mutually different focus states;
generating a reconstruction image from the obtained image signal;
causing a display to display a generated reconstruction image, and
receiving an instruction for performing enlarged display or reduced display;
wherein, upon receiving an instruction for performing enlarged display or reduced display a reconstruction image is displayed on the display, enlarged display or reduced display of the displayed reconstruction image, or enlarged display or reduced display of an other reconstruction image having a different focus state from the displayed reconstructed image is selectively performed.

* * * * *